United States Patent [19]

Gray et al.

[11] 4,392,121

[45] Jul. 5, 1983

[54] RECEIVER FOR A.C. ELECTRICAL SUPPLY SIGNALLING ARRANGEMENT

[75] Inventors: Frederick M. Gray, Stafford; Charles G. Leedham, Doveridge, both of England

[73] Assignee: The General Electric Company Limited, London, England

[21] Appl. No.: 212,209

[22] Filed: Dec. 2, 1980

[30] Foreign Application Priority Data

Dec. 7, 1979 [GB] United Kingdom ................ 7942399

[51] Int. Cl.³ .............................................. H04B 3/54
[52] U.S. Cl. .......................... 340/310 A; 340/310 R; 328/127; 328/151
[58] Field of Search ............... 340/310 A, 310 R, 316, 340/310 CP, 538; 323/318, 319, 235; 455/352; 307/3; 328/115, 151, 128, 127; 375/68

[56] References Cited

U.S. PATENT DOCUMENTS

| | | | |
|---|---|---|---|
| 4,097,692 | 6/1978 | Felix | 340/310 R |
| 4,106,007 | 8/1978 | Johnston et al. | 340/310 A |
| 4,218,655 | 8/1980 | Johnston et al. | 340/310 A |
| 4,300,126 | 11/1981 | Gajjar | 340/310 A |

FOREIGN PATENT DOCUMENTS

1500891 2/1978 United Kingdom ........... 340/310 A

Primary Examiner—Donnie L. Crosland
Attorney, Agent, or Firm—Kirschstein, Kirschstein, Ottinger & Cobrin

[57] ABSTRACT

A receiver for an a.c. electrical supply signalling arrangement of the kind in which information is transmitted by impressing on the supply voltage waveform voltage reductions which bridge the zero crossings in the waveform wherein detection by the receiver of an impressed voltage reduction is achieved by comparing the integral of the supply voltage over a period immediately preceding a voltage zero crossing when a voltage reduction is present with a corresponding integral obtained when no voltage reduction is present.

8 Claims, 3 Drawing Figures

RECEIVER FOR A.C. ELECTRICAL SUPPLY SIGNALLING ARRANGEMENT

This invention relates to a.c. electrical supply signalling arrangements.

In one such signalling arrangement, hereinafter referred to as a signalling arrangement of the kind specified, information is conveyed as a pattern of time-spaced voltage reductions impressed on the a.c. supply voltage waveform, each reduction being for a fraction of a cycle of the waveform including a voltage zero crossing.

The pattern of voltage reductions represents the information and is detected by the receivers of the arrangement.

A known receiver for use in a signalling arrangement of the kind specified comprises means for detecting the presence of an impressed voltage reduction by comparing the integral of the supply voltage waveform over a fraction of a cycle following the zero crossing included in that voltage reduction with the integral over a corresponding period when no voltage reduction is present. Such a receiver is disclosed in U.K. patent specification No. 1,500,891.

According to the present invention there is provided a receiver for use in a signalling arrangement of the kind specified comprising means for detecting the presence of an impressed voltage reduction by comparing the integral of the supply voltage waveform over a period extending over a fraction of a cycle ending not later than the voltage zero crossing included in that voltage reduction with the integral over a corresponding period when no voltage reduction is present.

The invention arises in consequence of the discovery by the inventor that under certain load conditions in an a.c. electrical supply system, in particular light load conditions, an impressed voltage reduction may be masked by other transient phenomena causing malfunction of receivers which detect impressed voltage reductions by post zero crossing integration.

The invention will now be further explained with reference to the accompanying drawings in which.

Figure 1:
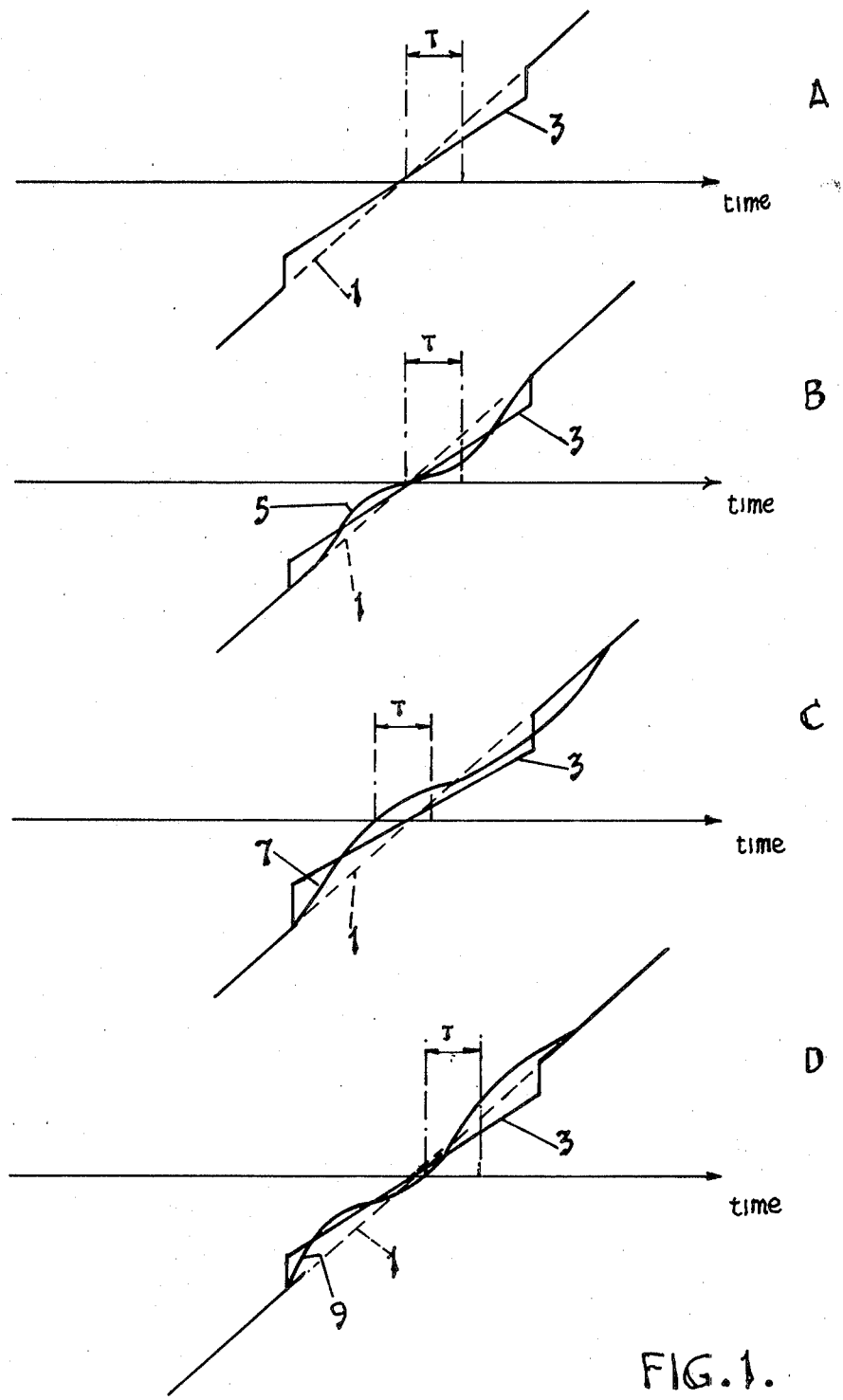
FIGS. 1A, 1B, 1C and 1D are waveforms illustating how the problem which the present invention solves arises.

Referring to FIG. 1A, line 1 shows the waveform of the supply voltage under normal load conditions in the region of a negative-to-positive zero crossing and line 3 shows the waveform when a voltage reduction is impressed for a short period bridging the zero-crossing. As can be seen the integral of the supply voltage over a small integration period T following the zero-crossing is reduced when the voltage reduction is impressed.

In FIGS. 1B, 1C and 1D the possible effects of the system natural resonance under light system load conditions is shown. In FIGS. 1B, 1C and 1D, lines 1 and 3 indicate the voltage waveform without and with impressed reduction under normal load conditions, as in FIG. 1A, and lines 5, 7 and 9 indicate the effects that different oscillatory transients arising on voltage reduction under light-load conditions may have. Thus in FIG. 1B, the transient reduces the integral with a resulting bigger difference in the integrals with and without an impressed voltage reduction. In FIG. 1C, the transient increases the integral with a resulting smaller difference in the integrals with and without an impressed voltage reduction. In FIG. 1D the transient actually increases the integral by so much that its value is larger than that obtained without an impressed voltage reduction, thus rendering a conventional post zero-crossing integration receiver incapable of correct operation however sensitive to integral difference it may be.

FIGS. 1B to 1D further indicate that if the waveform is integrated for a short period terminating not later than the zero crossing, as in a receiver according to the invention, the integral is always reduced by an impressed voltage reduction despite the occurrence of oscillatory transients.

In this connection it is pointed out that in a receiver according to the invention integration will normally be arranged to start at a predetermined point on the voltage waveform, but the duration of the integration period may vary since the transients may alter the time of occurrence of the following zero crossing. Hence, the smaller integral obtained by pre-zero-crossing integration compared with post-zero-crossing integration may result from a reduced integration period, a reduced slope of the waveform preceding the zero crossing or a combination of both these factors.

Figure 2:
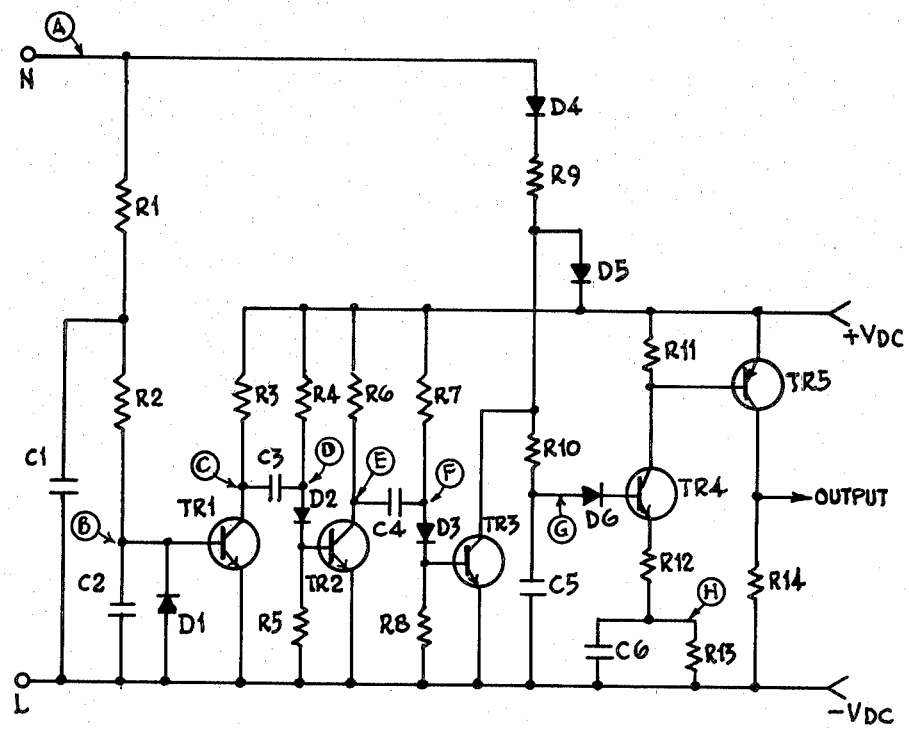
FIG. 2 is a circuit diagram of one embodiment of a receiver in accordance with the invention.

One embodiment of a receiver in accordance with the invention will now be described, by way of example, with reference to FIG. 2.

The receiver is intended for use in an information transmission arrangement wherein voltage reductions are impressed only on selected alternate cycles of the supply voltage waveform.

The receiver detects each such voltage reduction by comparing the integral of the supply voltage waveform over a short period ending at the negative to positive zero crossing in each cycle with the integral over the corresponding period of the preceding cycle. As explained above in relation to FIG. 1, operation of the transmitter to produce a voltage reduction results in a lower value of the integral and hence an impressed voltage reduction is indicated by the integral having a lower value than the preceding integral when necessarily no impressed voltage reduction was present due to the reductions being on alternate cycles.

The required integration is achieved in the receiver by feeding a capacitor C5 via resistors R9 and R10 and a rectifier D4 from the neutral-to-line supply voltage. (See FIG. 3A).

A transistor TR3 connected across the capacitor C5 and resistor R10 is arranged to become non-conducting a short time, e.g. about 1 millisecond, before the nominal time of occurrence of each negative-to-positive zero crossing in the supply voltage (i.e. each positive-to-negative zero crossing in the neutral-to-line voltage), and to remain non-conducting until a short time after the zero crossing.

The capacitor C5 charges up from the moment th transistor TR3 becomes non-conducting until the zero crossing, discharge of the capacitor C5 after the zero crossing being prevented by the diode D4. The capacitor C5 thus charges to a peak voltage (see FIG. 3G) representative of the integral of the supply voltage waveform over a short period preceding each negative-to-positive zero crossing of the supply voltage.

The resistor R10 is small in value and serves only to limit the discharge current of capacitor C5 when the transistor TR3 conducts.

A catching diode D5 prevents the capacitor C5 charging above the potential of the positive terminal of a d.c. supply for the receiver during exceptional supply voltage disturbances.

To detect a low value of peak charge on the capacitor C5, as results from an impressed voltage reduction, a memory capacitor 6 is charged from the capacitor C5. The capacitor C6 is connected in series with a resistor R12 between the negative terminal of the receiver d.c. supply and the emitter of a transistor TR4 whose base is connected via a rectifier D6 to the junction between the capacitor C5 and the resistor R10, the collector of transistor TR4 being connected via a resisotr R11 to the positive terminal of the receiver d.c. supply. The capacitor C6 thus charges to the peak value of the integration voltage on capacitor C5 (see FIG. 3G) less the voltage drops across rectifier D6 and the emitter-base junction of transistor TR4. Only a small current is extracted from the capacitor C5, the majority being provided through transistor TR4 via its collector circuit resistor R11 and the base/emitter circuit of transistor TR5. The resistor R12 limits the charging current of capacitor C6 to a practical value and the diode D6 protects the transistor TR4 from excessive reverse base-emitter voltage.

Figure 3:
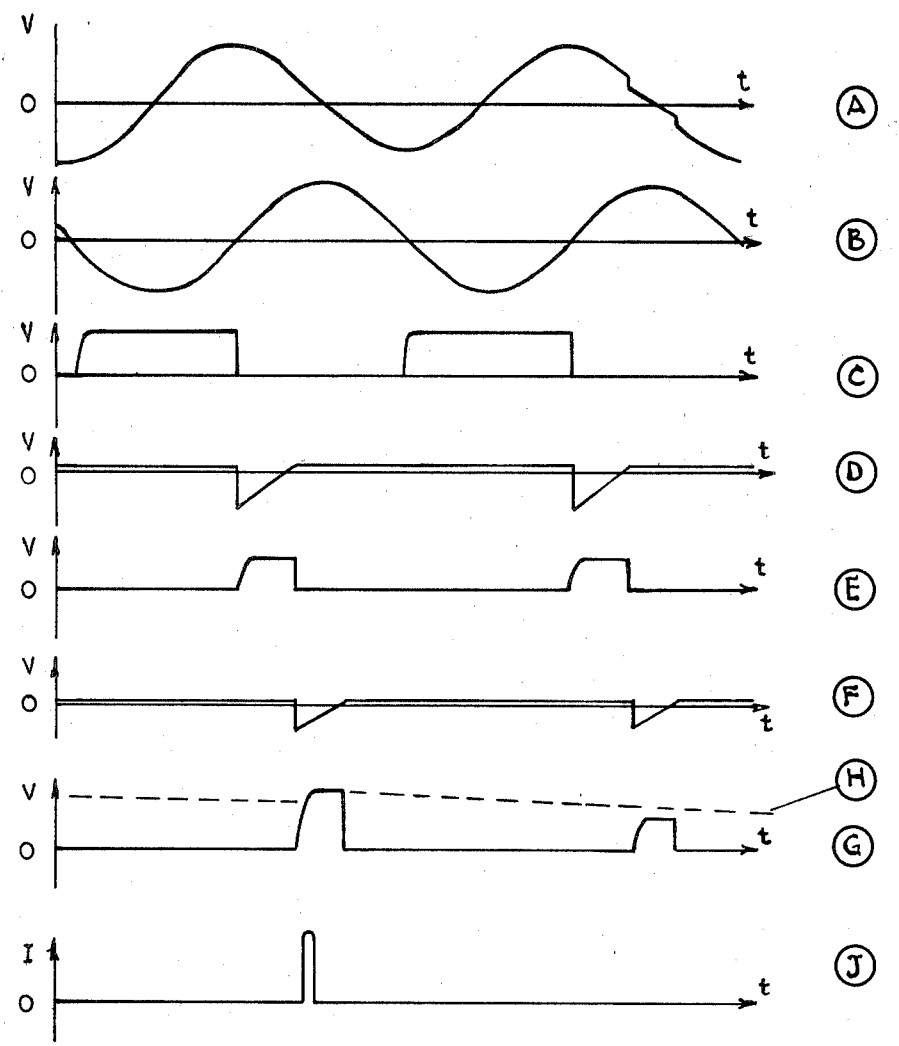
FIG. 3 shows the waveforms of voltages appearing at various points in the receiver of FIG. 2.

A bleed resistor R13 connected across the capacitor C6 discharges it at a relatively slow rate compared with its charging rate (see FIG. 3H). If a peak charging voltage across the capacitor C5 is greater than the voltage to which the capacitor C6 has discharged, the capacitor C6 will receive a pulse of charging current. If the peak charging voltage across the capacitor C5 is equal to or less than the voltage across capacitor C6 the capacitor C5 will not receive a pulse of charging current (see FIG. 3J).

The occurrence of a low peak charging voltage across the capacitor C5, such as results from operation of the transmitter, will thus be indicated by the absence of a charging current pulse for capacitor C6.

The slower the discharge rate of the capacitor C6, the smaller will be the reduction of the peak charging voltage of the capacitor C5 required to cause the loss of a charging current pulse. Thus the sensitivity of the receiver depends on the value of the resistor R13.

The charging current pulses of capacitor C6 are monitored by a transistor TR5 whose base is connected to the collector of transistor TR4, the receiver output being derived across a resistor R14 connected between the collector of transistor TR5 and the negative terminal of the receiver d.c. supply, the emitter of transistor TR5 being connected to the positive terminal of the receiver output this corresponds to the pattern of voltage reductions produced by the transmitter.

Alternatively, the charging current pulses may be monitored by a differentiator connected across the capacitor C6.

To obtain the required control of the conduction of the transistor TR3 the neutral-to-line voltage (FIG. 3A) is applied via a 90° phase shifting network comprising resistors R1, R2 and capacitors C1, C2 to the base of a transistor TR1 having a collector circuit resistor R3.

During negative excursions of the phase shifted voltage (see FIG. 3B) the transistor TR1 is held off by current through resistors R1, R2 and a rectifier D1 connected between the emitter and base of transistor TR1. Hence during these negative excursions the collector of transistor TR1 is at the potential of the positive terminal of the receiver supply. At the moment of the negative-to-positive zero crossing in the phase shifted voltage the transistor TR1 starts to conduct causing the collector potential of transistor TR1 (see FIG. 3C) to fall rapidly. The transistor TR1 then remains conducting until the following positive-to-negative zero crossing in the phase shifted voltage whereupon its collector potential returns to the positive receiver supply potential. The negative-going edges in the collector potential of transistor TR1 thus coincide with the negative peaks in the supply voltage waveform. The diode D1 serves to limit the reverse emitter-base voltage of transistor TR1.

The collector potential of transistor TR1 is coupled through a capacitor C3 and a rectifier D2 to the base of a transistor TR2 provided with a collector resistor or R6. The junction D between the capacitor C3 and the rectifier D2 is connected via a resistor R4 to the positive receiver supply terminal, and the base of the transistor TR2 is connected to the receiver negative supply terminal via a resistor R5. The negative-going edge in the transistor TR1 collector potential causes the transistor TR2 to switch off, the rectifier D2 limiting the reverse base-emitter bias voltage of transistor TR2. The capacitor C3 then charges via the resistor R4 with resultant rise in the potential at junction D (see FIG. 3D) to a value equal to the sum of the switch-on voltages of rectifier D2 and transistor TR2, the transistor TR2 thereafter remaining conducting until the next negative-going edge in the transistor TR1 collector potential. The transistor TR2 thus remains non-conducting after each negative peak in the supply voltage for a period set by the time constant of capacitor C3 and resistor R4, the values of these components being chosen so that transistor TR2 conducts a short period e.g. about 1 millisecond before the nominal time of occurrence of each negative-to-positive zero crossing in the supply voltage. Hence with a 50 Hz supply voltage the transistor TR2 becomes non-conducting for a period of about 4 milliseconds following each negative-going edge in the transistor TR1 collector potential, as indicated in FIG. 3E which shows the transistor TR2 collector potential.

The collector potential of transistor TR2 is coupled to the base of transistor TR3 through a capacitor C4 and a rectifier D3, the junction F between the capacitor C4 and the rectifier D3 being connected via a resistor R7 to the positive receiver supply terminal and the base of the transistor TR3 being connected via a resistor R8 to the negative reciver supply terminal.

The components C4, D3, R7 and R8 co-operate in similar manner to the components C3, D2, R4 and R5 to produce a potential at junction F (see FIG. 3F) which renders the transistor TR3 non-conducting for a period determined by components C4, R7 following the negative-going edge in the collector potential of transistor TR2. Thus transistor TR3 is rendered non-conducting a short period e.g. about 1 millisecond before each negative-to-positive zero crossing in the supply voltage, and components C4 and R7 are chosen so that transistor TR3 remains non-conducting until a short time after the zero crossing, as required.

We claim:

1. A receiver for use in an a.c. electrical supply signalling arrangement of the kind wherein information is conveyed as a pattern of time-spaced voltage reductions impressed on the a.c. supply voltage waveform, each reduction being for a fraction of a cycle of the waveform including a voltage zero crossing, the receiver comprising means for detecting the presence of an impressed voltage reduction by comparing the integral of the supply voltage waveform over a period extending over a small fraction of a cycle ending not later than the voltage zero crossing included in that voltage reduction with the integral over a corresponding period when no voltage reduction is present.

2. A receiver for use in an a.c. electrical supply signalling arrangement of the kind wherein information is conveyed as a pattern of time-spaced voltage reductions impressed on the a.c. supply voltage waveform, each reduction being for a fraction of a cycle of the waveform including a voltage zero crossing, the receiver comprising means for detecting the presence of an impressed voltage reduction including: an integrator responsive to the a.c. supply voltage to produce in respect of different cycles of the a.c. supply voltage waveform respective outputs each representative of the integral of said supply voltage over a period extending over a small fraction of a cycle ending not later than the voltage zero crossing included in that cycle; and comparator means for comparing outputs of said integrator for different cycles, thereby to indicate the presence of an impressed voltage reduction in response to the difference between the output for a cycle when a voltage reduction is present and the output for a cycle when a voltage reduction is not present.

3. A receiver according to claim 2 wherein the integration period extends from a predetermined point on the voltage waveform until the following voltage zero crossing.

4. A receiver according to claim 2 wherein the integrator is arranged to integrate the instantaneous value of the supply voltage over corresponding small fractions of a cycle each ending at a voltage zero crossing of the supply voltage, the integrator being reset between successive integration periods; and the comparator means indicates when the output of said integrator is less than the output of the integrator for the preceding integration period.

5. A receiver according to claim 4 wherein said comparator means comprises a capacitor arranged to charge substantially to the peak value of the output of the integrator; means for partly discharging said capacitor; and means for monitoring the supply of charging current to said capacitor.

6. A receiver according to claim 4 wherein said integrator comprises: a capacitance connected in series with a rectifier across said supply voltage; an electronic switch connected across said integrator capacitance; and means for opening said switch during each said integration period.

7. A receiver according to claim 6 wherein said means for opening said switch comprises: reference means responsive to the occurrence of a predetermined level in the supply voltage to produce an output at a predetermined time after the occurrence of said level; timing means responsive to the output of the reference means to produce an output signal for a predetermined period following the reference means output; and driver means for utilising the timing means output to open said switch.

8. A receiver according to claim 7 wherein said predetermined level is the peak value of the supply voltage.

* * * * *